INVENTORS
DUANE P. LITTLEJOHN
PETER M. LLEWELLYN
BY Wm. J. Nolan
ATTORNEY 3,445,649
ION CYCLOTRON RESONANCE SPECTROMETER
HAVING THE ANALYZER MEANS PIVOTALLY
MOUNTED ON THE MAGNET YOKE
Duane P. Littlejohn, Santa Clara, and Peter M. Llewellyn,
Menlo Park, Calif., assignors to Varian Associates, Palo
Alto, Calif., a corporation of California
Filed Oct. 11, 1965, Ser. No. 494,368
Int. Cl. B01d 59/44
U.S. Cl. 250—41.9                                    4 Claims

ABSTRACT OF THE DISCLOSURE

A spectrometer assembly including a pivotally mounted instrument housing and analyzer support means allowing for the selective removal and accurate repositioning of the analyzer structure within the magnetic air gap. In one position the analyzer is rotated clear allowing easy access to both analyzer and air gap. In the other position the analyzer structure is accurately repositioned between the pole faces of the magnet.

---

Figure 2:
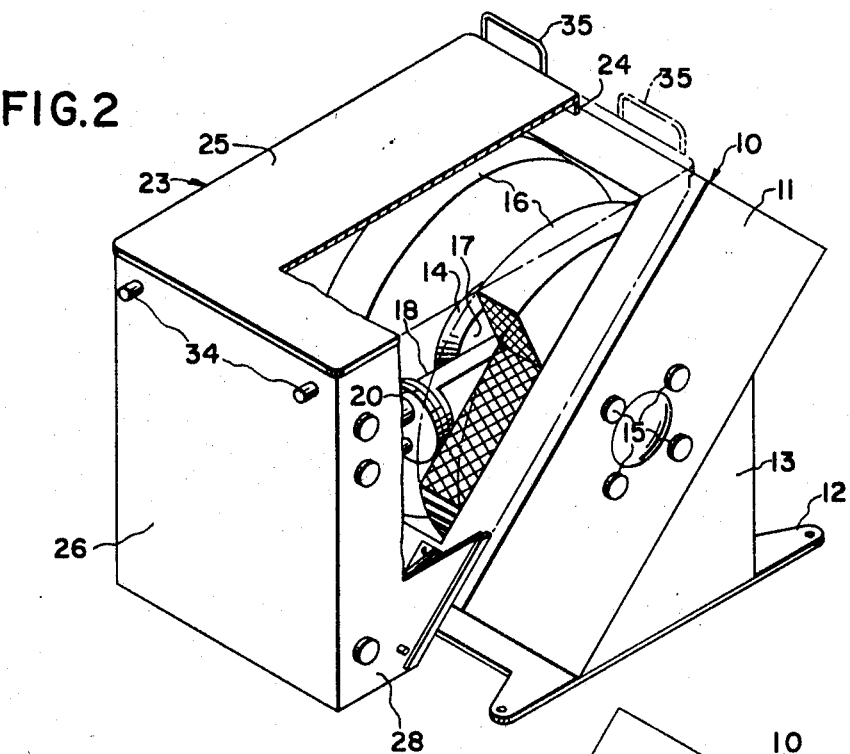

This invention relates generally to a spectrometer assembly and in particular to apparatus for positioning and supporting an analyzing structure between the pole faces of a large magnet of a spectrometer apparatus.

In spectrometers it is essential to locate the components accurately relative to each other. For example, in the case of a nuclear magnetic resonance spectrometer, resolution is directly dependent on the accuracy with which the probe apparatus containing the sample to be analyzed is centered in a homogeneous field between the pole faces of the magnet. Typically, the mounting structure for this probe apparatus comprises a base platform on which the main probe body is fixedly secured. The main probe body has mounted therein the necessary apparatus for conducting the high resolution experiment, for example, the transmitter coil, sweep coils, balancing members, and other related structural and electrical apparatus ordinarily found in such nuclear magnetic resonance probe bodies. Also there is normally securely mounted on the base platform an oven and associated equipment, leading ultimately into the sample holding device.

Similarly, in the case of mass spectrometers such as the magnetic deflection variety or ion cyclotron mass spectrometers of the type disclosed in copending application Ser. No. 456,173, filed May 17, 1965, now U.S. Patent 3,390,265, and assigned to the same assignee as the present invention, both resolution and sensitivity are dependent upon the accuracy with which the magnet means is positioned with respect to the analyzing structure. The ion cyclotron resonance mass spectrometer conventionally comprises an ion source, means for establishing an R.F. field and detection means all of which are mounted in an evacuable envelope. The envelope is supported between the pole pieces of a magnet such that there is an angle between the magnetic field and the R.F. field.

In all types of spectrometers, separation of parts and replacement of components are carried out necessitating relative movement between the analyzing structure and the magnet means with the result that in the past considerable difficulty has been experienced in repeatedly repositioning all the components accurately.

It is the object of the present invention to provide an improved spectrometer assembly which permits repeatable repositioning of its analyzing structure within its magnetic field region.

Briefly stated, in accordance with one teaching of the present invention there is disclosed a magnet having two pole members forming an air gap therebetween; an analyzing structure adapted to be inserted within the air gap; and means spaced from the gap for supporting the analyzing structure, movable from a first to a second position, being adapted and arranged to rest away from the gap in the first position to facilitate access to the gap and analyzing structure when the spectrometer is not in use, and in the second position to hold the analyzing structure within the gap when the spectrometer is in use.

Figure 1:
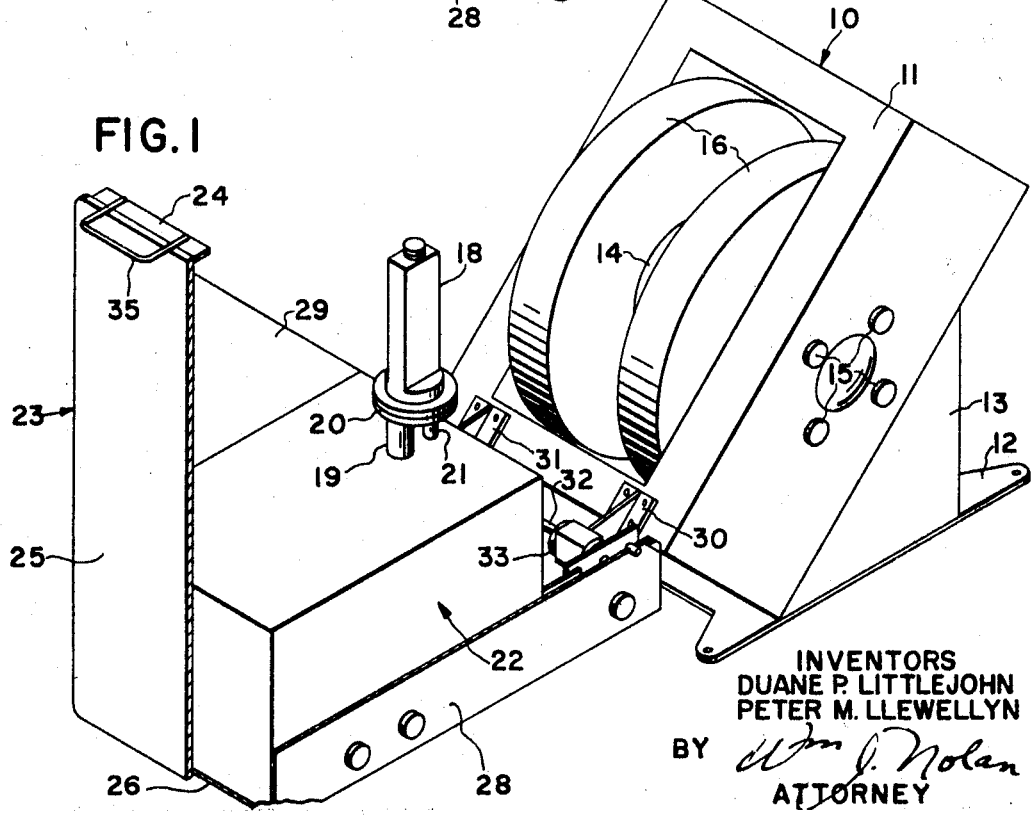

These and other objects and features of the present invention and a further understanding may be had by referring to the following description and claims, taken in conjunction with the following drawing in which:

FIG. 1 is a perspective view partially broken away showing the novel spectrometer assembly with support structure in first position; and FIG. 2 is a perspective view partially broken away with the support structure in second position.

Referring now to the drawing there is shown an assembly employing the novel features of the present invention. There is shown an electromagnet 10 including a solid, closed, rectangular shaped yoke 11 of highly permeable material such as iron. The yoke 11 is supported on a magnet stand 12 by yoke supports 13 in a plane defined by the yoke substantially at 45° to the vertical, and carries two magnetic pole piece members 14 collinearly disposed in spaced-apart relationship to define an air gap therebetween. A plurality of bolts 15 threaded into tapped holes in the pole piece members 14 serve to pull members 14 tightly against the yoke 11. Electric coil assembly 16 are coaxially mounted on each of the pole members 14 and are supplied with electric current in such a fashion as to make one of the poles north and the other pole south. The pole members 14 extend through the coil assemblies 16 and each is capped with a pole cap 17 fixedly secured thereto by a plurality of flush mounted cap screws (not shown).

The spectrometer apparatus is of the type disclosed in the above mentioned copending application and includes an elongated envelope 18 in which ionization and subsequent analysis occur. Evacuation of envelope 18 prior to sample introduction is by means of a standard type vacuum pump (not shown) connected through a tube 19 and vacuum-tight flanged joint 20. Once pumpdown has been achieved a gaseous sample to be analyzed can conveniently be introduced to structure 18 through a conduit 21 leading from a valveable inlet system (not shown). Means, including an oven 22, are provided for baking out the vacuum pump and inlet system.

The oven 22, in which are disposed the vacuum pump and inlet system, and envelope 18 are fixedly held within a support structure 23. Structure 23 includes rectangular front, top, and back walls 24, 25, and 26, respectively, and truncated triangular side walls 28, 29 bolted together to form an integral piece.

A pair of axle support means 30, 31 fixedly secured to yoke 11 support an axle 32. Structure 23 in turn is held against the ends of axle 32 and is adapted for pivotal movement about the axis defined by axle 32. A stop 33 along axle 32 permits transverse positioning of structure 23, hence transverse positioning of envelope 18 within the air gap between pole piece members 14.

Thus the structure 23 is adapted to be moved from a first open position (FIG. 1) to a second operating position (FIG. 2). In the open position, with feet 34 resting on a floor surface, for example, access both to the analyzing structure contained within envelope 18 and to the air gap between pole pieces 14 is facilitated. Structure 23 can then be raised by means of U-shaped handles 35 to the operating position with envelope 18 within the air gap between pole pieces 14.

Since many changes could be made in the above construction and many apparently widely different embodiments of this invention could be made without depart-

What is claimed is:

1. An ion cyclotron resonance spectrometer assembly comprising: a floor supported horizontal base member, a magnetic yoke structure mounted on said base member, a pair of spaced apart magnetic pole members defining an air gap therebetween mounted on said yoke structure, an instrument housing and support means pivotally mounted to a part of said yoke structure proximate said base member and rotatable through an angle of substantially 90° between a floor abutting position and a yoke abutting position, an analyzer means mounted within an evacuable envelope means and including an ion source, means for establishing an R.F. field at an angle to the magnetic field between said magnetic pole members, and detection means, said envelope means being rigidly mounted to said support means such that said analyzer means is positioned in said air gap when said support means is rotated into its yoke abutting position and is removed from said air gap enabling access to both gap and analyzer when said support means is rotated into its floor abutting position, pivot means pivotally connecting said housing and support means to said yoke structure and including means allowing axial adjustment of said instrument support means along the axis of said pivot means thereby enabling adjustment of the position of said analyzer means between said magnetic pole members, said pivot means being located such that said instrument housing and support means will remain static in either of said positions without benefit of latching means after having been so positioned.

2. A spectrometer assembly as recited in claim 1 wherein said yoke structure is mounted to said base member at an acute angle relative thereto facilitating access to both said gap and said analyzer when said support means is rotated into its floor abutting position.

3. A spectrometer assembly as recited in claim 1 wherein said pivot means includes spaced axle supports mounted to said yoke structure and an axle member passing through said axle supports and having each end rigidly fixed to said instrument support means, and wherein said axial adjustment means includes a pair of adjustably positioned stops mounted on said axle for locking said axle against axial movement relative to said axle supports.

4. A spectrometer assembly as recited in claim 3 wherein said instrument housing and support means includes bumper means affixed thereto for engaging the floor and upon which one side of said support means rests when said support means is rotated into its floor abutting position and further includes handle means for facilitating manual rotation of said support means about said pivot means between said aforementioned positions.

References Cited
UNITED STATES PATENTS

| | | | |
|---|---|---|---|
| 2,871,361 | 1/1959 | Andrews | 250—41.9 |
| 2,871,363 | 1/1959 | Andrews | 250—41.9 |
| 3,187,180 | 6/1965 | Willdig | 250—41.9 |

WILLIAM F. LINDQUIST, *Primary Examiner.*

U.S. Cl. X.R.

335—210